US008295262B2

(12) United States Patent
Muharemovic et al.

(10) Patent No.: US 8,295,262 B2
(45) Date of Patent: Oct. 23, 2012

(54) UPLINK REFERENCE SIGNAL FOR TIME AND FREQUENCY SCHEDULING OF TRANSMISSIONS

(75) Inventors: Tarik Muharemovic, Dallas, TX (US);
Aris Papasakellariou, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 667 days.

(21) Appl. No.: 11/536,418

(22) Filed: Sep. 28, 2006

(65) Prior Publication Data

US 2008/0043708 A1 Feb. 21, 2008

Related U.S. Application Data

(60) Provisional application No. 60/822,478, filed on Aug. 15, 2006.

(51) Int. Cl.
*H04B 7/208* (2006.01)

(52) U.S. Cl. ........ 370/344; 370/208; 370/329; 370/348; 370/436; 370/343; 370/345; 370/341

(58) Field of Classification Search .................. 370/208, 370/344, 348, 436, 343, 345, 341, 329; 455/68, 455/69, 450

See application file for complete search history.

(56) References Cited

U.S. PATENT DOCUMENTS

| 6,226,337 B1* | 5/2001 | Klank et al. | 375/367 |
| 2007/0041311 A1* | 2/2007 | Baum et al. | 370/208 |
| 2007/0189404 A1* | 8/2007 | Baum et al. | 375/260 |
| 2008/0123616 A1* | 5/2008 | Lee | 370/344 |

OTHER PUBLICATIONS

3rd Generation Partnership Project (TR 25.814 v2.0.0), (Jun. 2006), Technical Specification Group Radio Access Network Physical Layer Aspects for Evolved UTRA, (Release 7); p. 1-88.*

* cited by examiner

*Primary Examiner* — Kamran Afshar
*Assistant Examiner* — Khalid Shaheed
(74) *Attorney, Agent, or Firm* — Steven A. Shaw; W. James Brady; Frederick J. Telecky, Jr.

(57) ABSTRACT

A method for multiplexing reference signal (RS) transmissions from user equipments (UEs), with the RS having a bandwidth larger than the data signal bandwidth (distributed RS) is provided. A transmission time interval (TTI) comprises of one or more sub-frames and each sub-frame comprises of at least two RS transmission periods and a plurality of data signal transmission periods. A distributed RS is transmitted during at least one of the at least two RS transmission periods in at least one of the sub-frames comprising the TTI. During the remaining RS transmission periods, for a UE having a data signal transmission, the RS bandwidth is substantially the same as the data signal bandwidth (localized RS). The total system bandwidth is divided into contiguous, non-overlapping sub-bandwidths, called reference signal multiplexing blocks (RSMBs). Transmission of distributed RS occurs within an RSMB and does not cross over different RSMBs. The size and number of RSMBs can be re-configurable in time and a re-configuration period is much larger than the TTI duration.

29 Claims, 18 Drawing Sheets

UPLINK REFERENCE SIGNAL FOR TIME AND FREQUENCY SCHEDULING OF TRANSMISSIONS

CROSS-REFERENCE TO RELATED APPLICATIONS

This application claims priority to and incorporates by reference U.S. Provisional Application No. 60/822,478, filed Aug. 15, 2006, entitled "Design of the Uplink Reference [Pilot] Signal in EUTRA", Tarik Muharemovic and Aris Papasakellariou inventors.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Embodiments of the invention are directed, in general, to communication systems and, more specifically, to the multiplexing of uplink reference signals and the partitioning of scheduling bandwidths in communication systems.

Embodiments of the invention apply, inter alia, to DFT-spread OFDMA frequency division multiple access (FDMA) communication systems, also commonly referred to as single carrier FDMA or SC-FDMA, such as the one adopted in EUTRA. The EUTRA sub-frame structure 100 is shown in FIG. 1 and consists of long blocks (LB) 110 and short blocks (SB) 121 & 122, where each block has a corresponding cyclic prefix (CP) 130. Cyclic Prefix (CP) durations are not necessarily the same for all blocks. Uplink pilot (also referred to as reference signal) transmission is assumed to be confined in SB1 121 and SB2 122 whereas the data and/or control transmission occupies long blocks (LBs). Unless explicitly mentioned otherwise, data transmission refers to either data or control transmission. The use of SB for data or partial use of a LB for RS can be optional, and is not precluded.

FIG. 2 is a block diagram showing a DFT-spread OFDM (A) transmitter, with "localized" sub-carrier mapping; thus, FIG. 2 is also an example of "localized" SC-OFDM(A) transmitter. It comprises of Modulated Symbols 201, serial to parallel conversion 202, Discrete Fourier Transform (DFT) block 203, Inverse Fast Fourier Transform (IFFT) block 206 Parallel to Serial (P/S) converter 207, and RF block 208. Zero padding is inserted in sub-carriers 205 (used by another UE) and 204 (guard sub-carriers), cyclic prefix is added at 210. Elements of apparatus may be implemented in hardware or as components in a programmable processor or Digital Signal Processor (DSP).

FIG. 3 is a block diagram showing a DFT-spread OFDM (A) (bracketed letter "A" means that the statement holds for both DFT-spread OFDM and DFT-spread OFDMA) transmitter, with "distributed" sub-carrier mapping; thus, FIG. 3 is also an example of "distributed" SC-OFDMA transmitter. It comprises of Modulated Symbols 301, serial to parallel conversion 302, Discrete Fourier Transform (DFT) block 303, Inverse Fast Fourier Transform (IFFT) block 306 Parallel to Serial (P/S) converter 307, and RF block 308. Zero padding is inserted in sub-carriers 305 (used by another UE) and 304 (other zero sub-carriers, which can be used by other UEs or as guard sub-carriers), cyclic prefix is added at 310. Elements of apparatus may be implemented in hardware or as components in a programmable processor or Digital Signal Processor (DSP).

Either localized (FIG. 2) or distributed (FIG. 3) DFT-spread OFDMA may be applied to either one of short blocks (SB) or long blocks (LB). FIGS. 2 and 3 only convey the spirit of the transmission, and not the exact numerology as the DFT size may typically consist of tens or hundreds of sub-carriers.

For localized DFT-spread OFDMA transmission, the set of used (by an individual UE) sub-carriers is contiguous, whereas for distributed DFT-spread OFDMA transmission, the set of used (by an individual UE) sub-carriers is non-contiguous and the sub-carriers are equally spaced. This is illustrated in FIG. 4, moreover, because in the exemplary embodiment of the EUTRA uplink sub-frame structure in FIG. 1, the SB duration is half the LB duration, the sub-carrier bandwidth in SB (both in SB1 and SB2) is twice as large as the one in LB. Obviously, for a different relative duration of SB and LB, the corresponding sub-carrier spacing will scale proportionally. The set of LB sub-carriers is divided into resource blocks (RBs) for purposes of multiple access and channel dependent (frequency and/or time domain) scheduling. For localized LB data transmission, a RB contains an integer number of contiguous sub-carriers. The operating system bandwidth is divided into multiple LB RBs whose number N is (typically, but not necessarily) given by the ratio of the operating system bandwidth over the RB size. The scheduler may assign one or more (typically consecutive) RBs to a particular UE and scheduling granularity is one or more sub-frames.

SUMMARY

A method for multiplexing reference signal (RS) transmissions from user equipments (UEs), with the RS having a transmission bandwidth that is larger than the bandwidth occupied by data signals (distributed RS), in a sub-frame comprising of RS and data signal transmission periods is provided. A UE having a distributed RS transmission may or may not have a corresponding data signal transmission. In the exemplary embodiment, a transmission time interval (TTI) comprises of one or more sub-frames and each sub-frame comprises of two RS transmission periods and several data signal transmission periods. A distributed RS typically occupies a bandwidth larger than the data signal and is transmitted during at least one of the two RS transmission periods in at least one of the sub-frames comprising the TTI. During the remaining RS transmission periods, for a UE having a data signal transmission, the RS transmission has substantially the same bandwidth as the data signal transmission (localized RS). A UE not having a data signal transmission may transmit a distributed RS during any of the distributed RS transmission periods and does not transmit an RS during the remaining RS transmission periods (localized RS transmission periods).

Another embodiment provides a method for dividing a total system bandwidth into smaller bandwidths, called reference signal multiplexing blocks (RSMBs), where scheduling of data signal transmission from a user equipment (UE) during a transmission time interval (TTI) is confined within a single RSMB. A distributed RS transmission from a UE belonging in an RSMB is confined either within the same RSMB or a different RSMB, but does not cross over different RSMBs.

The aforementioned methods provide for efficient scheduling of data signal transmissions in the uplink of a communications system. They allow for estimation of a channel quality, on which scheduling of data signal transmission is based, in a reliable fashion and offer the ability to efficiently multiplex distributed reference signals transmitted from multiple user equipments for the purposes of channel quality indicator estimation and, in case of data signal transmission by the same UE, channel estimation. These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with the accompanying drawings and detailed description, wherein like reference numerals represent like parts.

DETAILED DESCRIPTION

It should be understood that although exemplary implementations of some of the embodiments of the invention are described in the following, the invention is not limited to these exemplary implementations, drawings, and techniques, including the exemplary design and implementation illustrated and described herein, but may be modified within the scope of the appended claims along with their full scope of equivalents.

Figure 4:
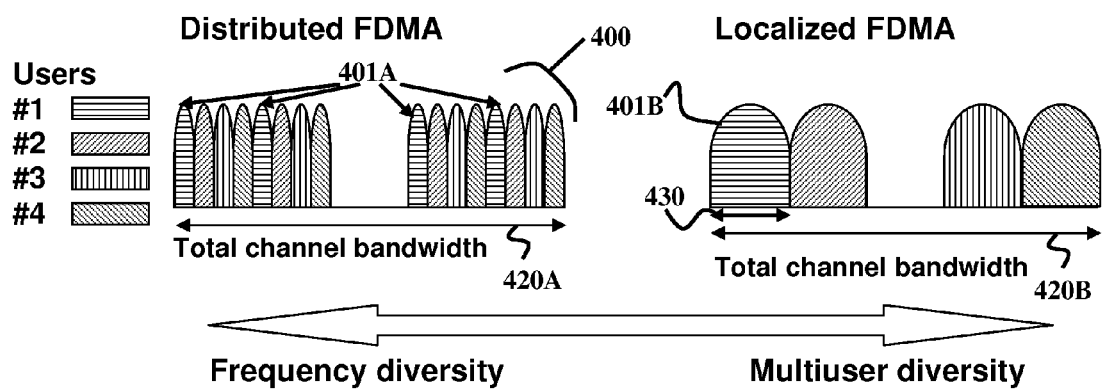
FIG. 4 is a diagram illustrative of distributed and localized FDMA transmission.
Figure 5:
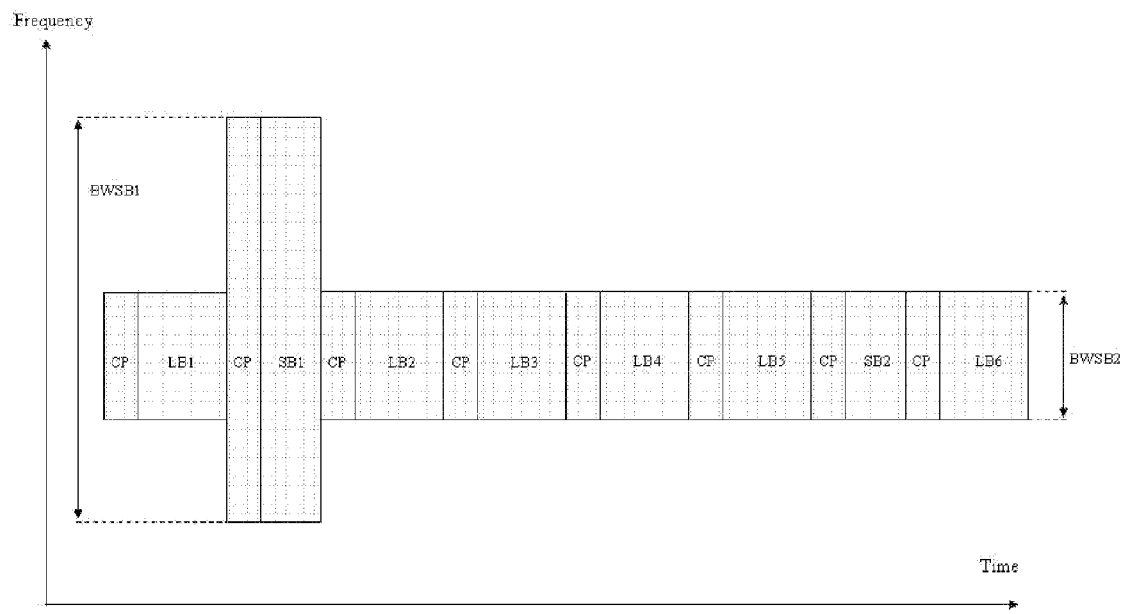
FIG. 5 shows first example of a sub-frame structure where BWSB2=BWLB and BWSB1>BWLB.
Figure 6:
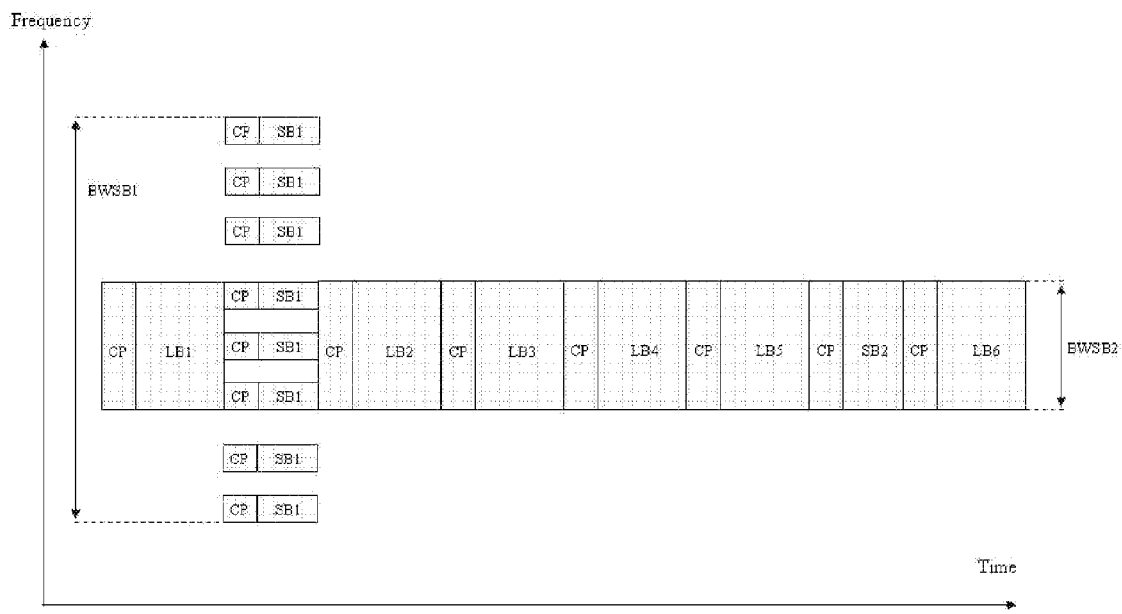
FIG. 6 shows second example of a sub-frame structure where BWSB2=BWLB and BWSB1>BWLB.
Figure 7:
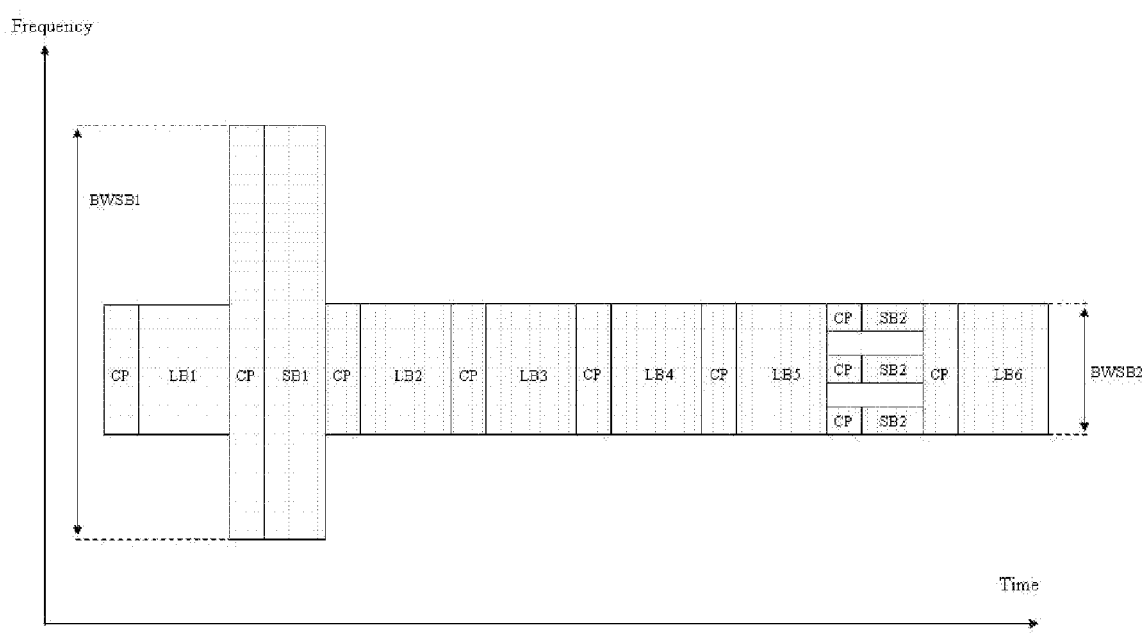
FIG. 7 shows third example of a sub-frame structure where BWSB2=BWLB and BWSB1>BWLB.
Figure 8:
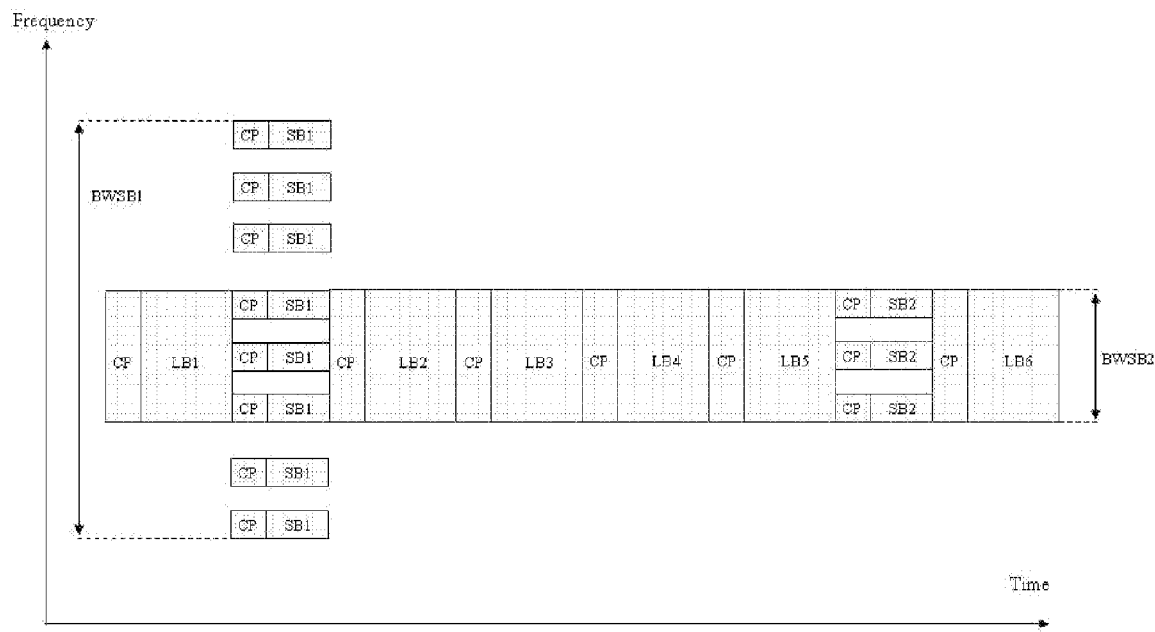
FIG. 8 shows fourth example of a sub-frame structure where BWSB2=BWLB and BWSB1>BWLB.
Figure 9:
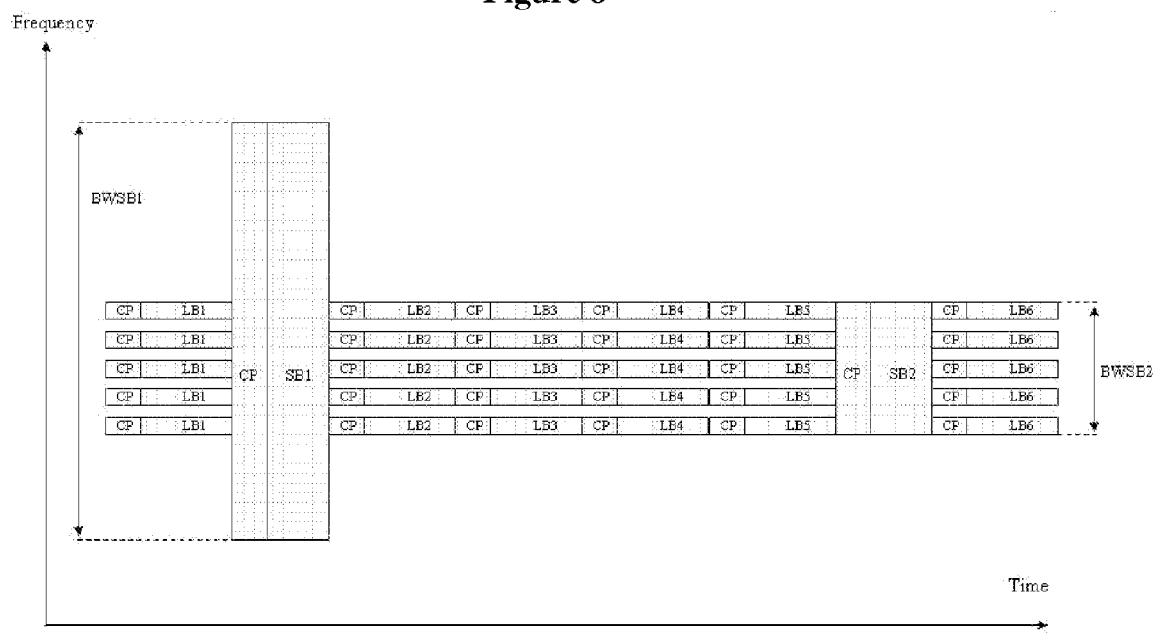
FIG. 9 shows fifth example of a sub-frame structure where BWSB2=BWLB and BWSB1>BWLB.
Figure 10:
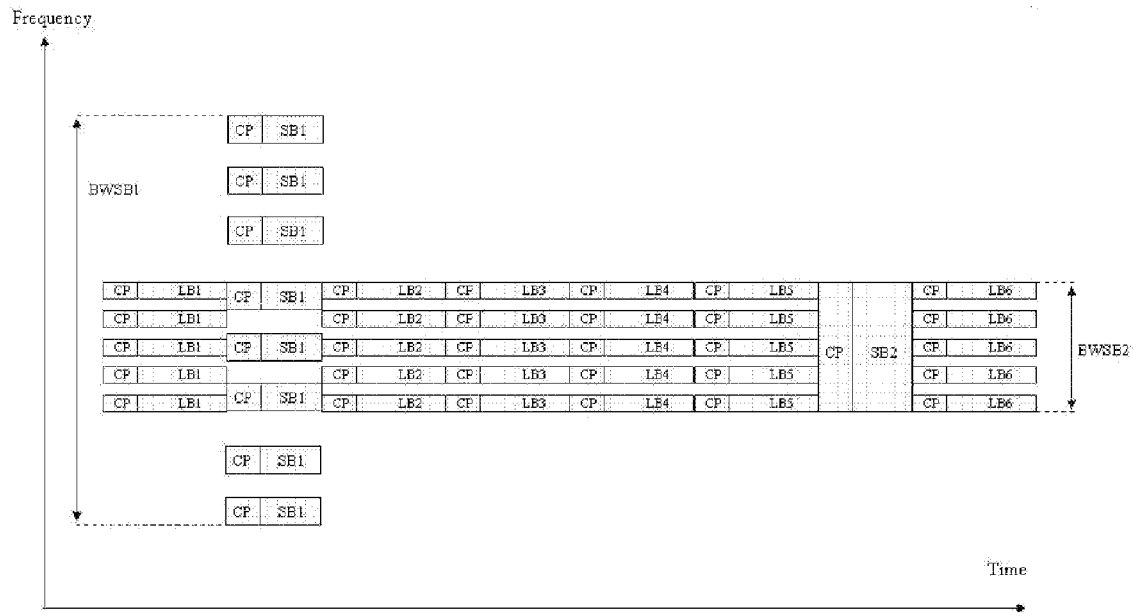
FIG. 10 shows sixth example of a sub-frame structure where BWSB2=BWLB and BWSB1>BWLB.
Figure 11:
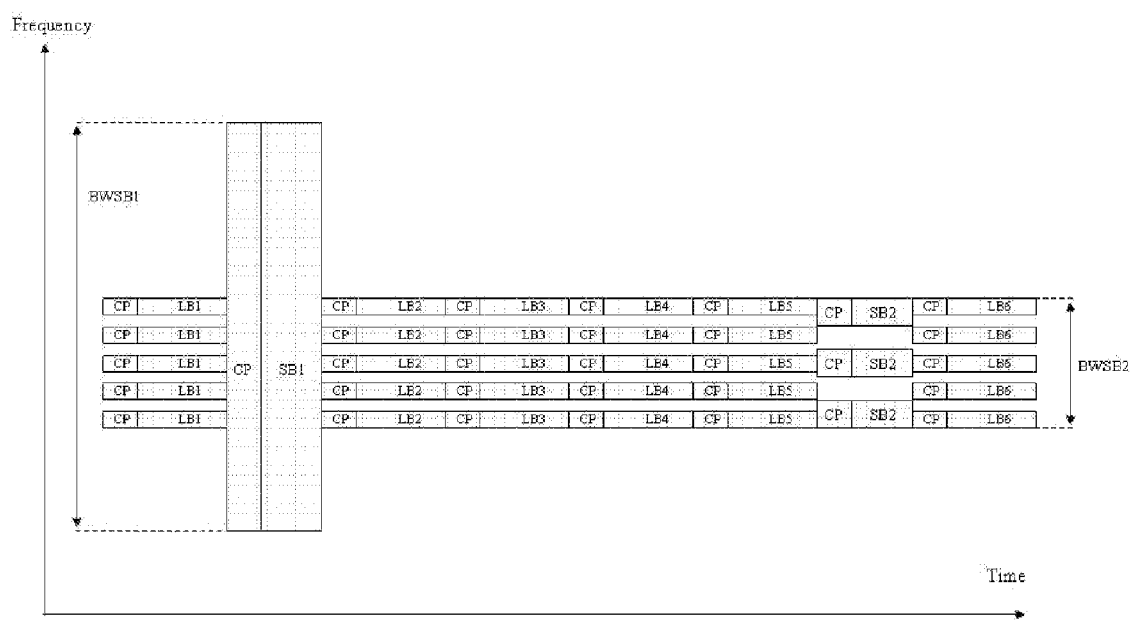
FIG. 11 shows seventh example of a sub-frame structure where BWSB2=BWLB and BWSB1>BWLB.
Figure 12:
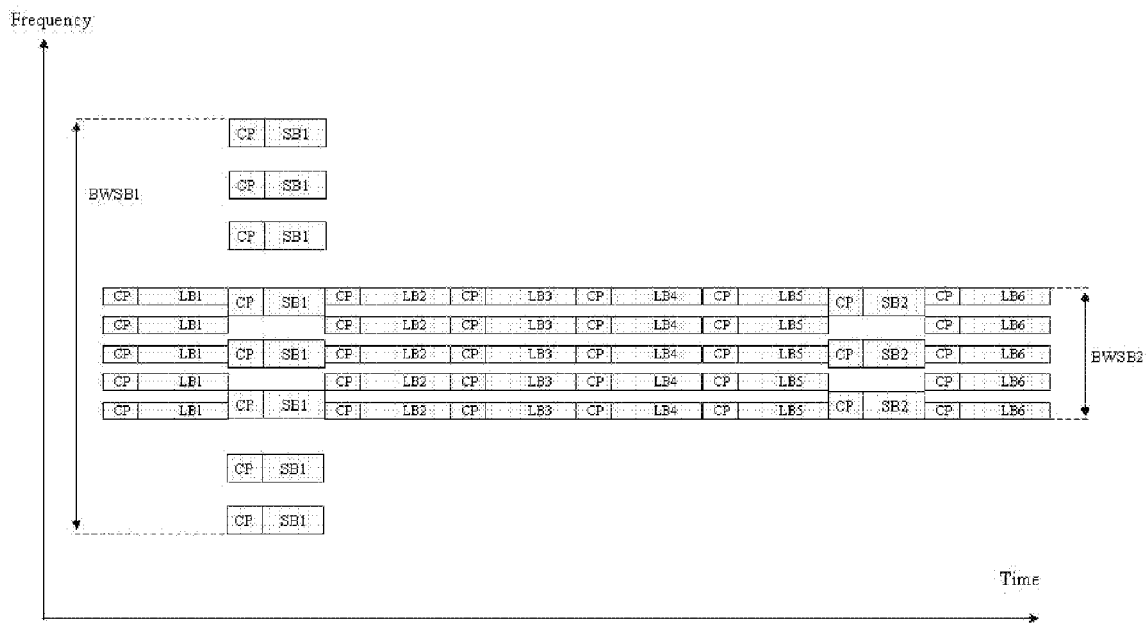
FIG. 12 shows eighth example of a sub-frame structure where BWSB2=BWLB and BWSB1>BWLB.

This disclosure assumes that, in addition to possible channel dependent time domain scheduling to the data signal transmission, the base station (also occasionally referred to as Node B) may also potentially apply channel dependent frequency domain scheduling to the transmission of the data and possibly the control signals. As it is well known in the art, to enable channel dependent frequency domain scheduling the operating bandwidth is divided into LB RBs consisting of groups of sub-carriers as previously described (FIG. 4—Localized FDMA). For each LB RB, the scheduler decides which UE(s) will transmit in that RB, and other parameters related to this transmission as it is well known in the art. This information is signaled to UEs via a downlink control channel.

Figure 1:
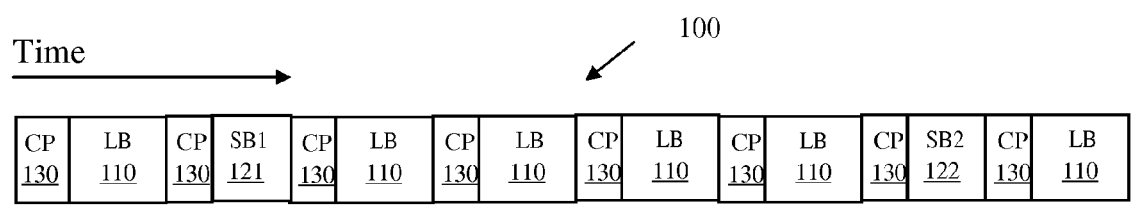
FIG. 1 shows the structure of an uplink sub-frame.
Figure 2:
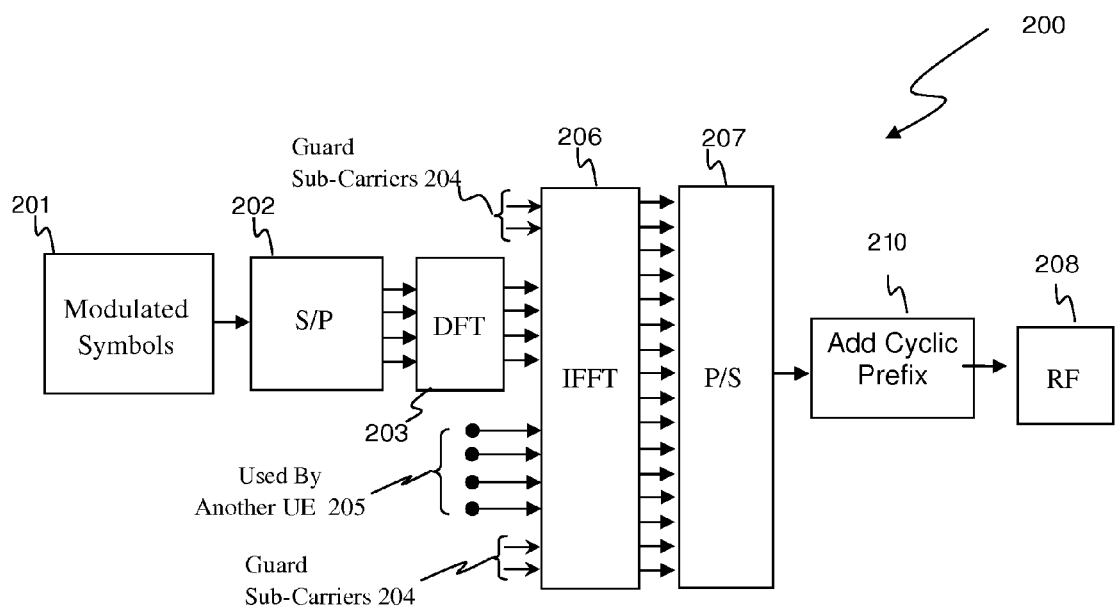
FIG. 2 is a diagram illustrative of a DFT-spread transmitter with "localized" sub-carrier mapping.
Figure 3:
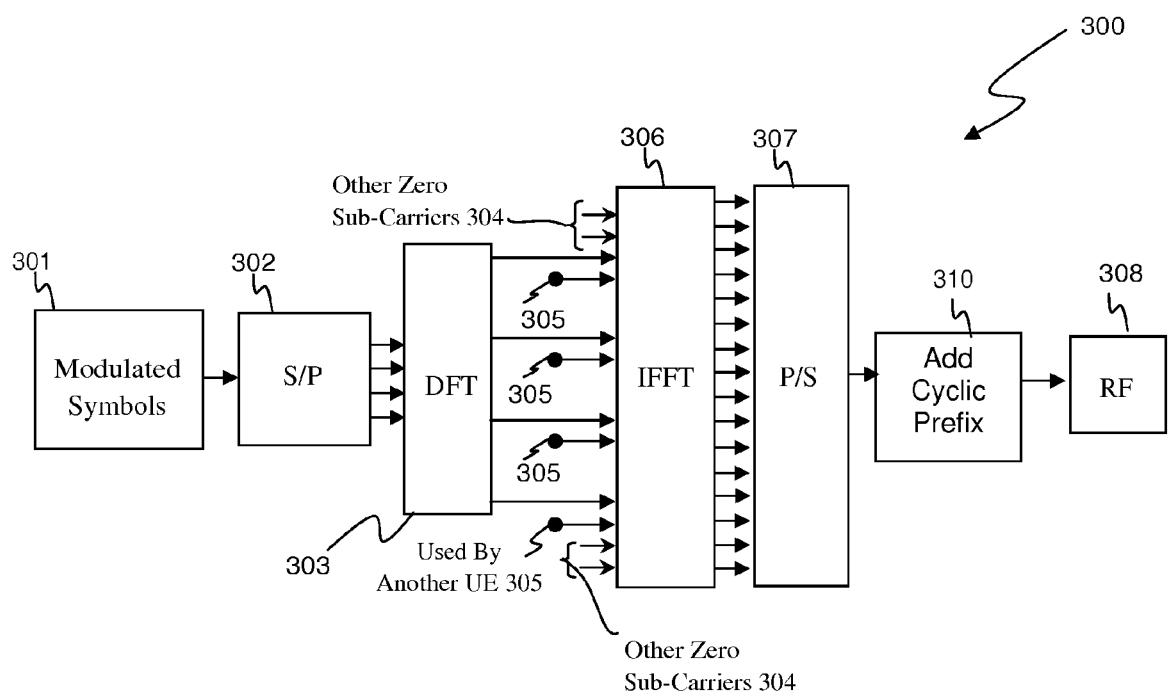
FIG. 3 is a diagram illustrative of a DFT-spread transmitter with "distributed" sub-carrier mapping.

In the main embodiment of the invention, the UE RS transmission in one of the two SBs (either SB1 or SB2) of a sub-frame (FIG. 1), for one or more of the sub-frames comprising the transmission time interval (TTI), is scheduled jointly with the LB RBs that are used for the UE data signal transmission. In contrast, the UE RS transmission in the other of the two SBs of a sub-frame, for one or more of the sub-frames comprising the TTI, occurs independently of the UE data signal transmission in the LB RBs and this RS transmission can also be from a UE not having a data signal transmission. From this point on, it is assumed that RS transmission in SB2 is scheduled jointly with data signal transmission in the LBs (RBs in SB2 correspond to the RBs in the LBs), while RS transmission in SB1 occurs independently of data signal transmission in the LBs. Nevertheless, all subsequent designs are also valid with the roles of SB1 and SB2 interchanged.

Embodiments of the invention assume that a localized RS is transmitted in SB2 to serve for channel estimation at the Node B receiver, only in the frequency band (BWLB) occupied by the data channel LB RBs (FIGS. 5-12). This means that the aggregate transmission bandwidth occupied by SB2 is (approximately) the same as the aggregate transmission bandwidth occupied by each LB so that BWSB2=BWLB. Therefore, SB2 will be referred to as the scheduled SB. For example, if a UE is scheduled on two (typically consecutive) RBs in the LBs, BWSB2 is two times as large as when a UE is scheduled on one RB in the LBs. The "≈" sign is used (instead of =) because the exact equality may not be always practical. Since it is assumed that the Node B performs scheduling of the data transmission in the LBs, the SB2 transmission is jointly scheduled with the data transmission in the LBs to facilitate, among others functionalities, channel estimation for coherent data demodulation. Having the RS in SB2 occupy substantially the same bandwidth as the data signal transmission by the same UE concentrates the RS transmitted power in the corresponding bandwidth and consequently it is optimal with respect to channel estimation for data demodulation.

For any UE and one or more sub-frames comprising a TTI, the group of sub-carriers used in SB2 of a sub-frame is directly associated with the group of sub-carriers used in at least one LB of the same sub-frame. The RS transmission band in SB2 of a sub-frame coincides with the data signal transmission band in at least one of LB of the same sub-frame.

The RS transmission in SB1 of a sub-frame is distributed over the entire scheduling bandwidth, may have a dual purpose, and the following characteristics:

RS transmission in SB1 of a sub-frame occurs so that the Node B becomes aware of the wireless channel filtering on the transmitted RS over the scheduling bandwidth.

One purpose of RS transmission in SB1 of a sub-frame is for "channel sounding" which is then used for scheduling in subsequent sub-frames or TTIs. Consequently, one defining characteristic of the RS in SB1 is that its occupied frequency band is larger than the frequency band occupied by the data signal transmitted by the same UE in at least one LB of the same sub-frame. Furthermore, a UE is allowed to transmit a RS in SB1 even when it has no data transmission in any of the LBs of the same sub-frame; and RS transmission in SB1 of a sub-frame encompasses the frequency band occupied by the data signal transmitted by the same UE in at least one LB of the same sub-frame. The other purpose of RS transmission in SB1 of a sub-frame is channel estimation for coherent demodulation of the data signal transmitted in at least one LB of the same sub-frame. Consequently, the second defining characteristic of SB1 is that the frequency band occupied by the RS in SB1 also contains the frequency band occupied by the data signal transmitted by the same UE in at least one LB of the same sub-frame. This second characteristic of SB1 is crucial for high-speed UEs requiring channel estimates from both SB1 and SB2 as time domain interpolation between SB2 and the LBs in the beginning of the sub-frame may not be possible.

For TTIs comprising of more than one sub-frame, or for UEs scheduled in consecutive TTIs, and for low-speed UEs, this second characteristic of RS transmission in SB1 may be optionally omitted for some sub-frames. This is because enough RS energy for channel estimation may be contained in the SB2 while enough CQI accuracy may be obtained by the RS transmitted in some but not all of SB1. In that case, additional RS transmission opportunities in any of remaining SB1 may be afforded to UEs not having a data signal transmission in any of the LBs of the sub-frame corresponding to that SB1. Moreover, the reference UE may transmit a distributed RS in SB1 over another scheduling bandwidth (RSMB), in sub-frames it is not transmitting it over its assigned scheduling bandwidth (RSMB), in order to probe the other RSMB for possible future scheduling (FIGS. 15-22).

In the context of RS transmission, the terms "localized" and "distributed" do not apply to the shape of the transmission spectrum but they are used to designate the relative RS bandwidth with respect to the data signal bandwidth. Both distributed and localized RS can be transmitted through CDM, FDM, or Hybrid CDM/FDM multiplexing, inside a single RSMB. The RS occupies every Q-th sub-carrier, where Q=1 for CDM, Q>1 for FDM and Q>1 for some combinations of Hybrid CDM/FDM multiplexing.

Several examples of the above described design are shown in FIGS. 5-12 and FIGS. 15-22. The term "total bandwidth used" by a signal may also include some unused sub-carriers, like in FIG. 6. This also applies to the other Figures of the disclosed invention.

In order to perform frequency domain scheduling of the RS in SB2, the corresponding set of SB sub-carriers is also divided into RBs, referred to as "SB RBs," or "SB2 RBs." Frequency domain scheduling of the RS in SB2 can be derived from the one for the data signal transmitted in at least one LB of the same sub-frame. The number of SB RBs is assumed to be integer and is denoted as L. Note that the term "scheduling" for the RS in SB2 only means that the Node B decides, a) which UE(s) transmits RS in the particular SB2 RBs; and b) which particular RS is transmitted in the particular SB2 RBs. This information, along with other scheduling information for data and/or control channels may be communicated to UEs via downlink control signaling. Note that if there is only a single option for the RS or if the RS is predetermined by other means, (b) is not necessary. Also, the above scheduling information for SB2 is implicitly communicated. For example, if a UE is scheduled on specific RBs in at least one LB of a sub-frame for data signal transmission, this directly implies that the UE is also scheduled in the corresponding SB2 RBs of the same sub-frame for RS transmission. This correspondence may also involve identities of all scheduled UEs.

Figure 13:
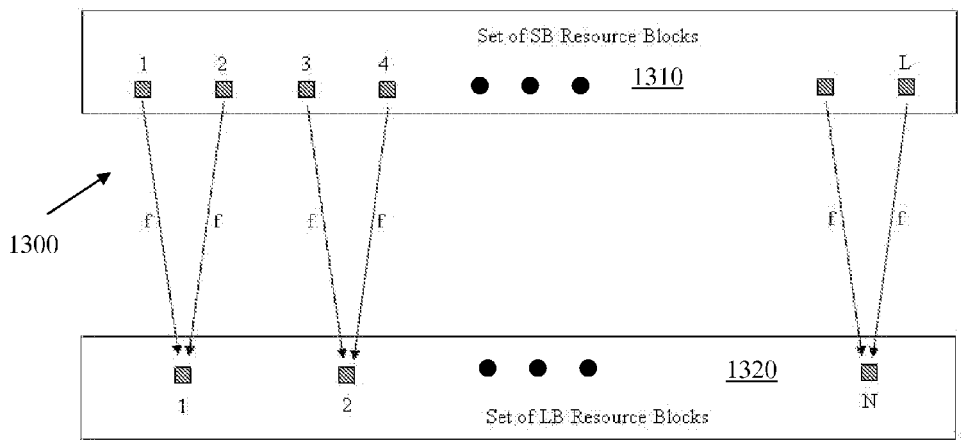
FIG. 13 is a map showing for each mapped SB resource block "f" associates One LB resource block.

FIG. 13 is a map showing that for each mapped SB RB "f" associates one LB RB. In order to perform joint scheduling of the RS in SB2 and the data signal in at least one of the LBs in the same sub-frame, embodiments of the invention define a correspondence "f" between SB2 RBs 1310 and LB RBs 1320 as follows. For every SB2 RB, "f" associates only one LB RB. The correspondence "f" will henceforth be referred to as the "resource map." This doesn't preclude the possibility where some SB2 RBs are left unmapped as they may not correspond to any LB RB for any UE.

For each LB RB and each scheduling period (typically a TTI), the Node B scheduler decides which UE(s) will use that particular RB for data signal transmission in at least one LB of a sub-frame. The scheduling information is sent to UEs via downlink control signaling. Each scheduled UE determines which SB2 RB it must use based on the resource map "f," as follows. Each scheduled UE is only allowed to use those SB2 RBs that map to the assigned (to that UE) LB RBs. When only one UE is scheduled on a particular LB RB it may use all SB2 RBs which map (via "f") to that particular LB RB. If more than one UE is scheduled on a particular LB RB, (for example, in case of "virtual MIMO", or if one UE uses the RB during some LBs while another UE used the same RB for the remaining LBs of the same sub-frame or a different sub-frame of the same TTI), each scheduled UE may use the identities of all other scheduled UEs to implicitly determine the SB2 RBs it shall use (from all SB2 RBs which map to that particular LB RB). This is because RS from more than one UE need to be multiplexed in SB2. For example, UEs with lower UE identities or UEs whose identities appear first in the downlink control channel carrying the scheduling information may use SB2 RBs with the lower index. In case of code division multiplexing (CDM) of RS from multiple UEs within a particular SB2 RB, the identities of these UEs may be used to determine which particular RS sequence (or which cyclic shift of a given RS sequence), each scheduled UE uses. In case of frequency division multiplexing (FDM) the same applies for the comb in the spectrum the RS from each UE uses. The same also applies for the RS transmission in SB1 from UEs having a data signal transmission. RS scheduling for transmission in SB1, in case it is distributed, from UEs without data transmission can be obtained in a similar manner but without including any scheduling information for the data signal of those UEs in the downlink control channel. This implies joint coding in a single codeword of the downlink control channels associated with scheduling of UEs for uplink transmission. Alternatively, for separate coding, the previous information may be explicitly signaled to each scheduled UE.

As described above, the transmission bandwidth of SB2 is determined in each scheduling period. Consequently, the transmission bandwidth of SB2 can vary (per scheduling period) between 0 Hz (when that UE is not scheduled in LB), to the full scheduling bandwidth (when the data signal from only one UE occupies the entire scheduling bandwidth). In contrast, since SB1 is used for channel sounding, it typically occupies a larger bandwidth which substantially equals one of the scheduling bandwidths (RSMBs).

Figure 14:
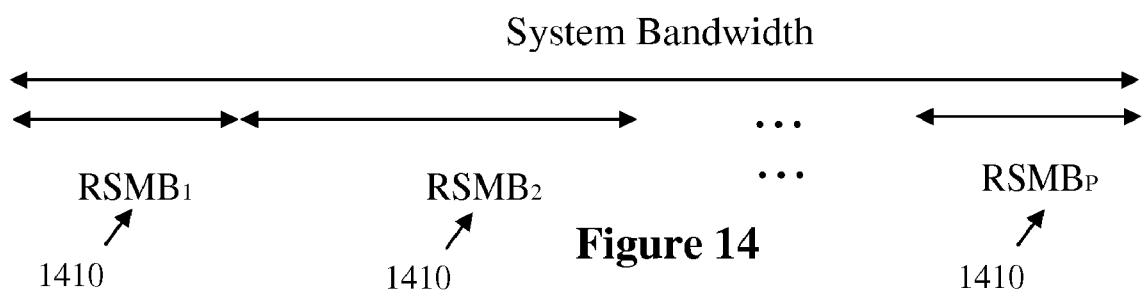
FIG. 14 shows a partition of the aggregate system bandwidth into P reference signal multiplexing blocks (RSMBs).
Figure 15:
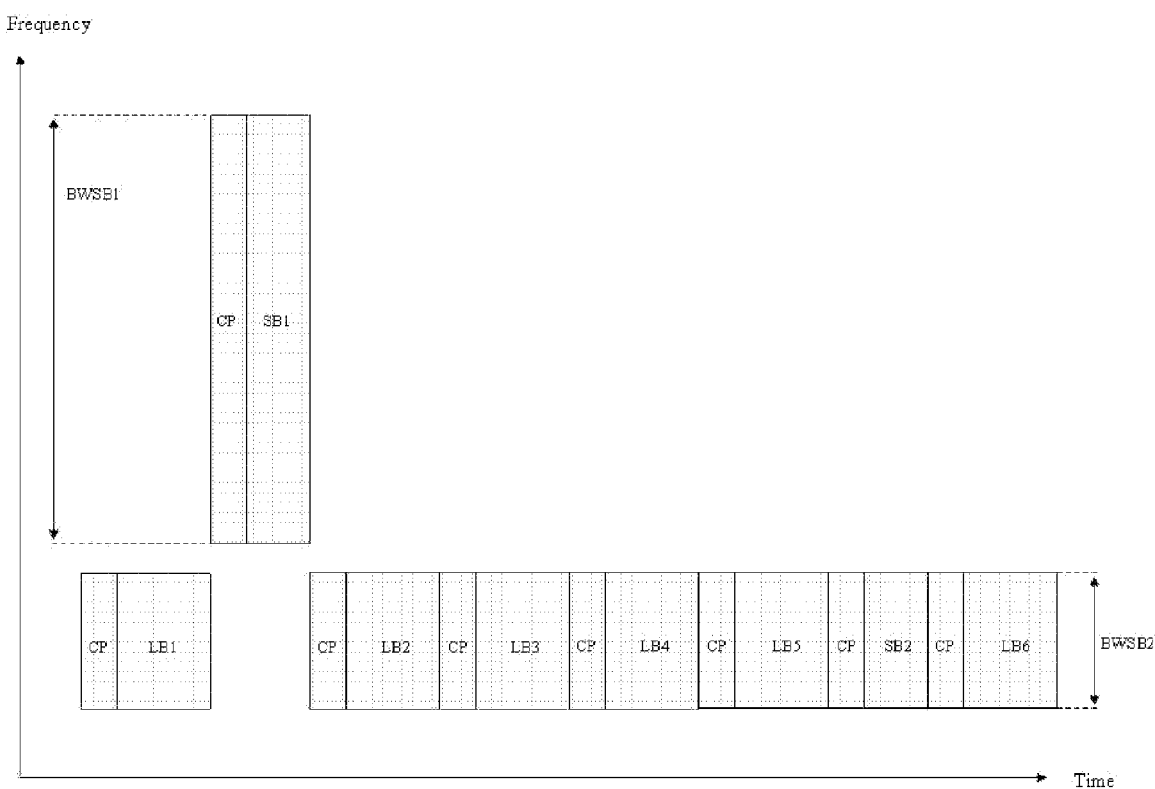
FIG. 15 shows ninth example of a sub-frame structure where BWSB2=BWLB and BWSB1>BWLB.
Figure 16:
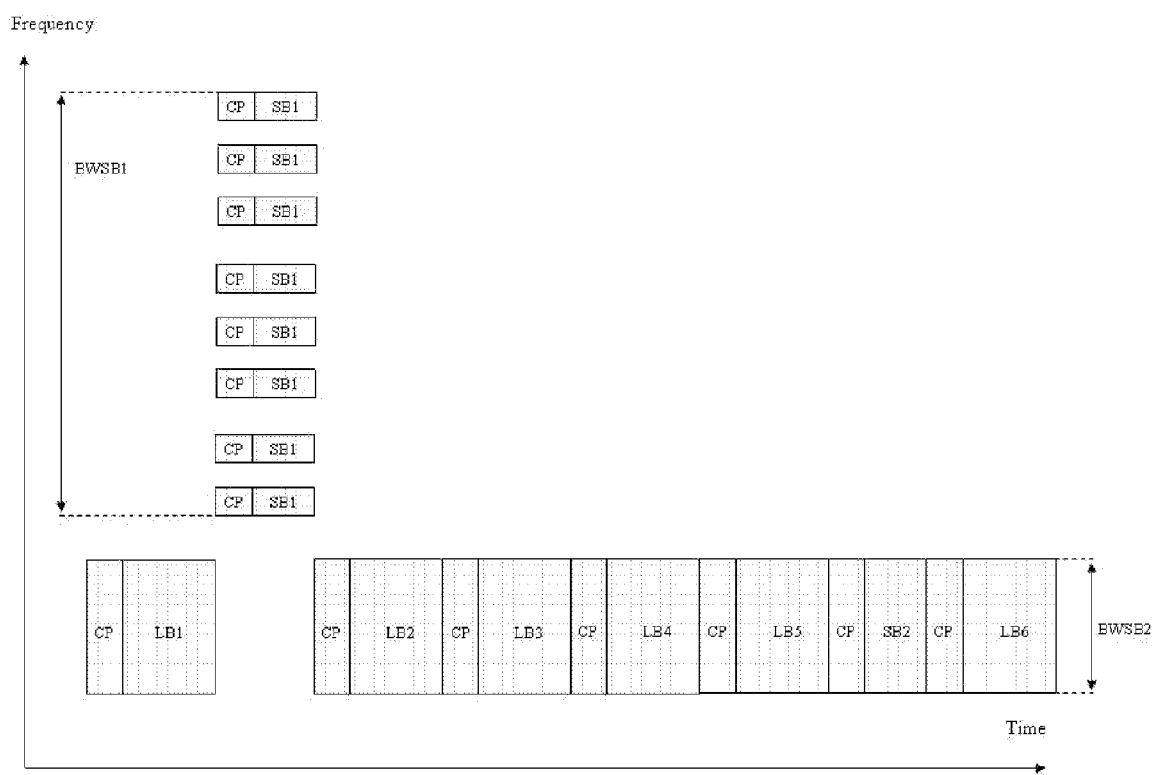
FIG. 16 shows tenth example of a sub-frame structure where BWSB2=BWLB and BWSB1>BWLB.
Figure 17:
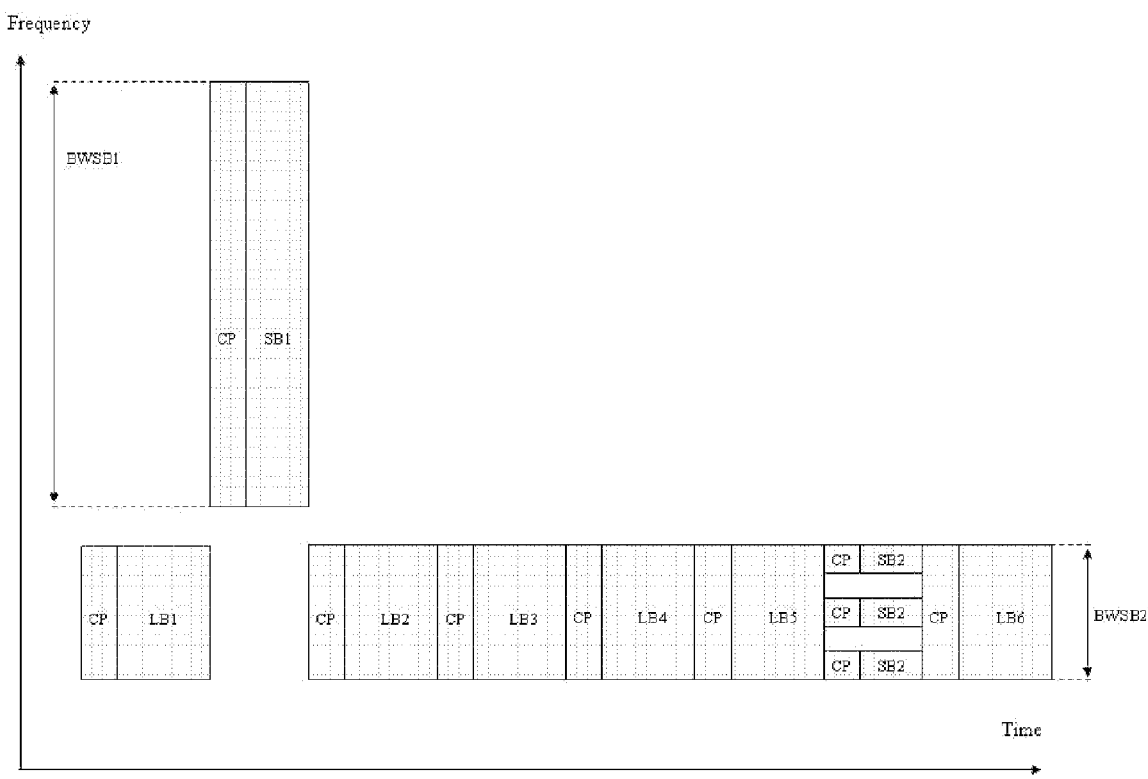
FIG. 17 shows eleventh example of a sub-frame structure where BWSB2=BWLB and BWSB1>BWLB.
Figure 18:
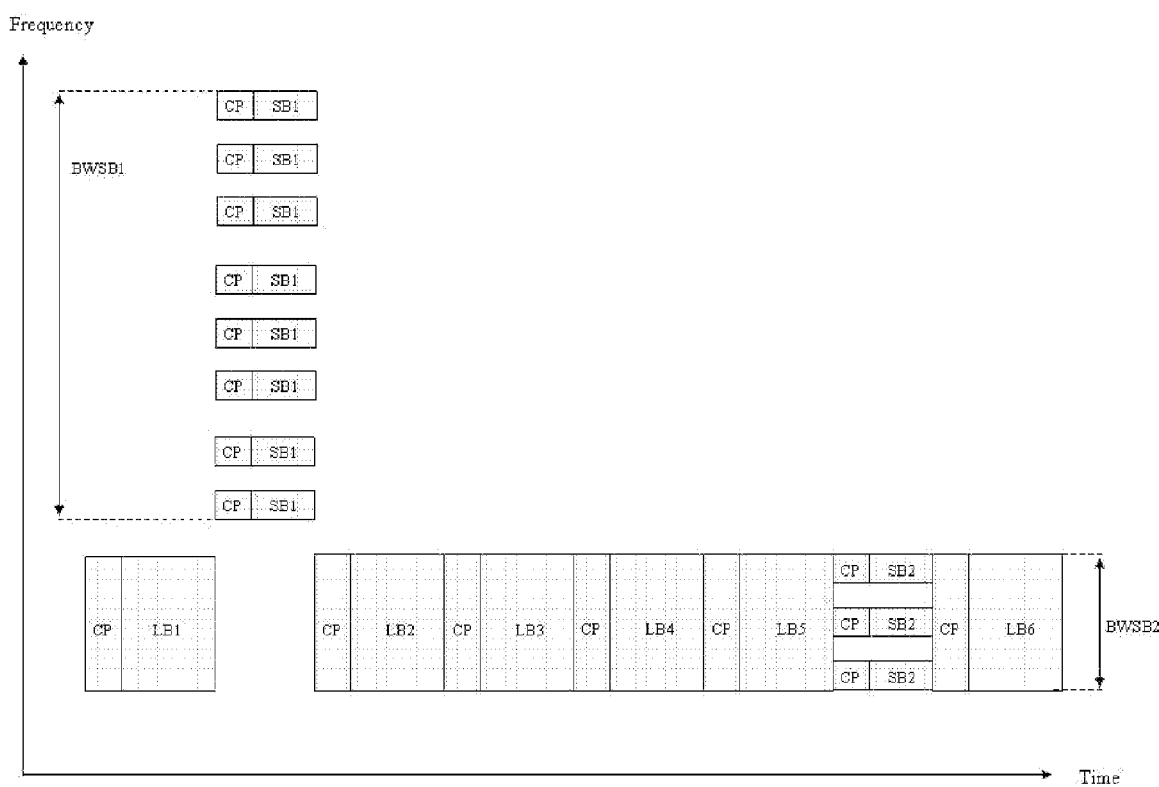
FIG. 18 shows twelfth example of a sub-frame structure where BWSB2=BWLB and BWSB1>BWLB.
Figure 19:
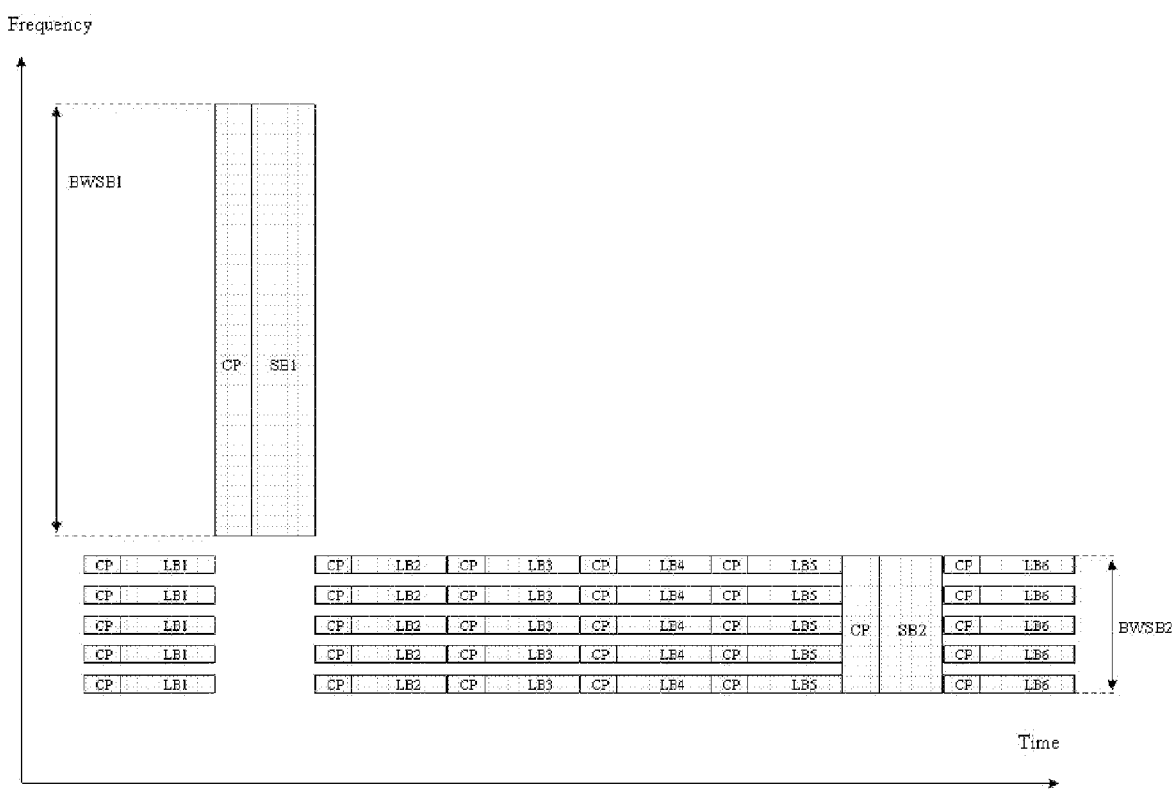
FIG. 19 shows thirteenth example of a sub-frame structure where BWSB2=BWLB and BWSB1>BWLB.
Figure 20:
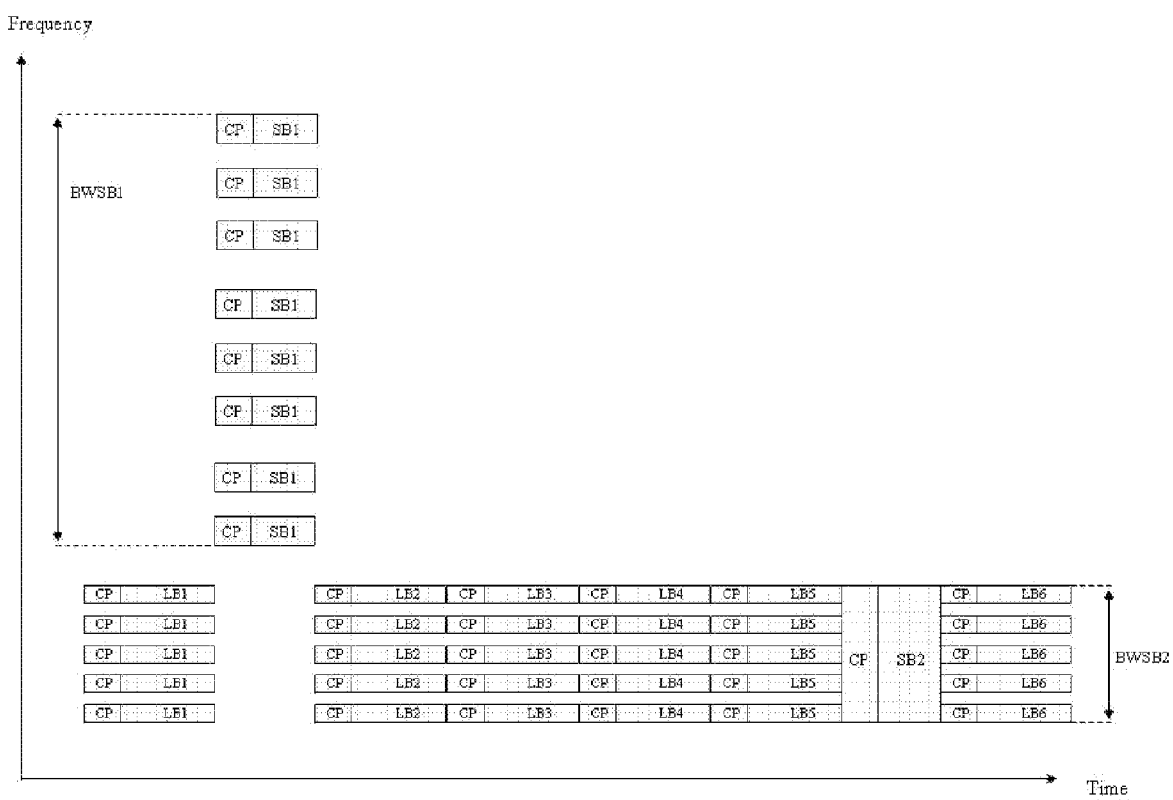
FIG. 20 shows fourteenth example of a sub-frame structure where BWSB2=BWLB and BWSB1>BWLB.
Figure 21:
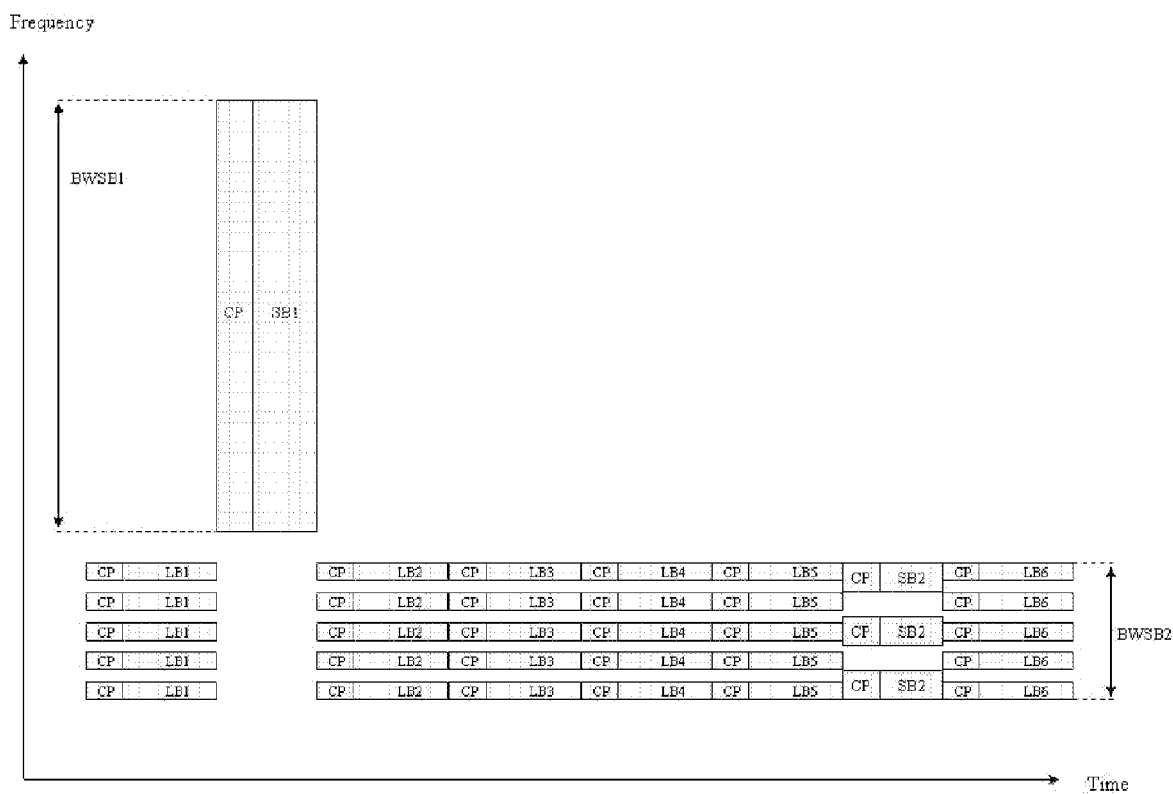
FIG. 21 shows fifteenth example of a sub-frame structure where BWSB2=BWLB and BWSB1>BWLB.
Figure 22:
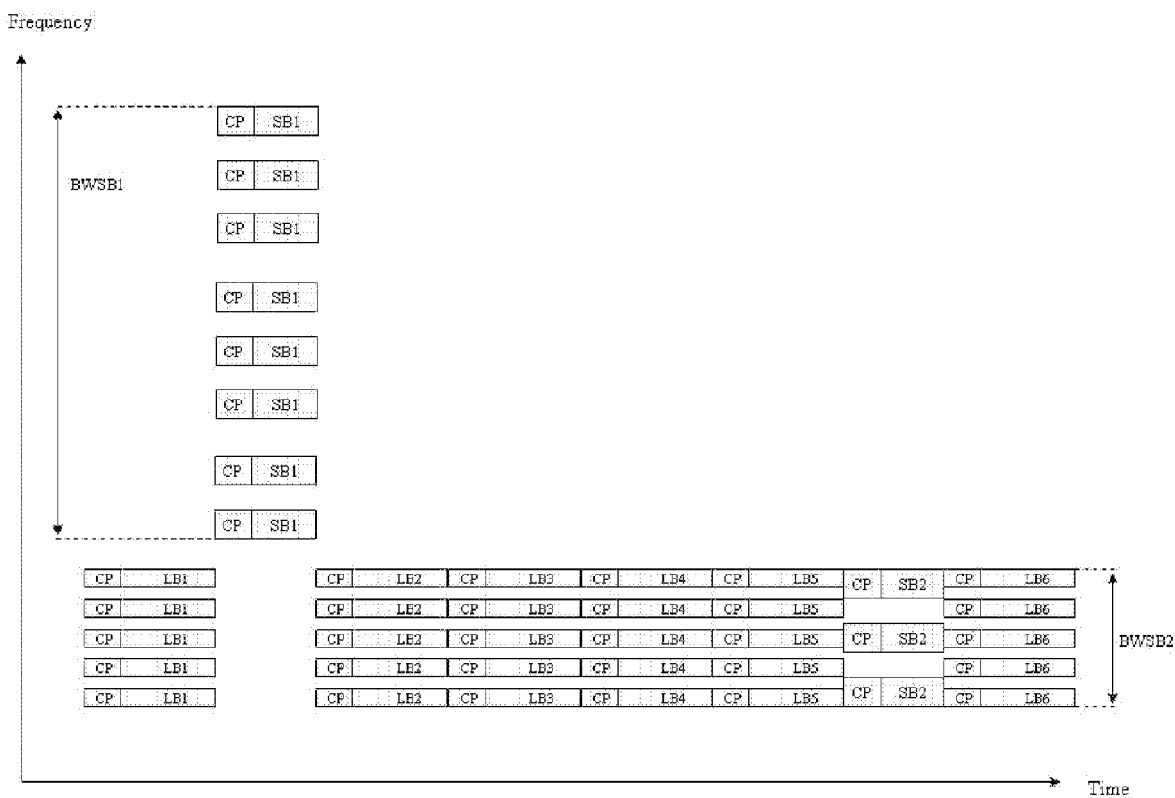
FIG. 22 shows sixteenth example of a sub-frame structure where BWSB2=BWLB and BWSB1>BWLB.

As previously mentioned, the reason for a UE to transmit RS in SB1 with a larger bandwidth (equal to the scheduling bandwidth), than the one used for its data signal transmission, is the so called "channel sounding". Channel sounding provides the Node B channel quality indication (CQI) over the scheduling bandwidth. In order to accommodate simultaneous distributed RS transmission from a large number of UEs or improve the quality of CQI estimation, a UE may not use the aggregate system bandwidth for sounding in SB1. Instead, the transmission bandwidth of RS in SB1 is restricted to a smaller, scheduling bandwidth. In the disclosed invention, the total system bandwidth is divided into smaller, non-overlapping, contiguous scheduling bandwidths that are referred to as Reference Signal Multiplexing Blocks (RSMBs) 1410, as shown in FIG. 14.

The maximum number K of distributed RS that can be simultaneously multiplexed (with CDM or Distributed FDM) inside a contiguous frequency band (for SB1) is limited, mainly due to the signal propagation characteristics through the channel. This number can be optimized for the operating conditions, and, for EUTRA, it is typically between 4 and 8. To illustrate the increase in the number of simultaneously multiplexed distributed RS afforded by the RSMB concept, assume K=6, an aggregate system bandwidth of 5 MHz, and that 10 distributed RS need to be simultaneously multiplexed in SB1. Clearly, since K<10, simultaneous multiplexing of distributed RS in the same SB1 is not possible over the total system bandwidth. However, by dividing the total system bandwidth into two contiguous RSMBs of 2.5 MHz each, then for example, 5 (out of 10) distributed RS can be simultaneously multiplexed inside the first RSMB, and the other 5 can be simultaneously multiplexed inside the second RSMB during the same SB1.

Having a scheduling bandwidth that is smaller that the total one can also improve the quality of the CQI estimate as the distributed RS energy is concentrated in a smaller bandwidth. In general, when a relatively large number of UEs need to be scheduled (and therefore send distributed RS in SB1 for CQI estimation), the total system bandwidth can be partitioned into multiple RSMBs.

Distributed RS from at most K UEs are multiplexed (with CDM or Distributed FDM) within each RSMB. Therefore, the scheduling bandwidth of each UE using a particular RSMB is equal to the bandwidth of that RSMB. This scheduling bandwidth may be communicated to UEs and this communication may be independent and at a much lower rate than the scheduling information. Moreover, the RS transmission bandwidth (and RSMBs) in the SB1 of some sub-frames may even not change for the duration of the communication.

RSMBs can be reconfigurable at a low rate (a lot less often that the TTI). For example, two or more RSMBs may be combined to form a larger RSMB, (for transmissions from higher data rate UEs or for UEs in good channel conditions) and the reverse.

The previous discussion considered the UEs as independent entities. Nevertheless, the term "different UEs" may also refer and is equally applicable to the case of multiple transmit antennas belonging to the same UE.

The above discussion assumes that the Node B performs (frequency and/or time domain) channel dependent scheduling for data transmission in each LB. Nevertheless, RBs in one or more of the LBs in a sub-frame may be designated for control channel transmission which may not be scheduled and may differ from the data transmission. Furthermore, this control transmission may belong to UEs other than the one having the data signal transmission. All herein described designs also apply to this scenario, except that in the above text LB refers exclusively to the ones carrying data.

Embodiments of the invention apply to RS transmission by a UE, where the RS in at least one out of multiple RS transmission periods in a sub-frame of a transmission time interval occupies substantially the same bandwidth as the data signal (localized RS) and the RS in at least one other RS transmission period in the same sub-frame occupies a larger bandwidth than the data signal (distributed RS). A special case occurs when only the distributed RS is transmitted, and a data signal is not transmitted which implies that the localized RS is not transmitted (the distributed RS is transmitted by a UE not having a data signal transmission).

Embodiments of the invention consider a sub-frame having at least two RS transmission periods and multiple data signal transmission periods. For the scheduling process of a data signal transmitted by a UE having a serving Node B, the Node B scheduler uses the RS transmitted from that UE substantially over the entire scheduling bandwidth in at least one of the at least two RS transmission periods of a previous sub-frame to derive a CQI estimate over the scheduling bandwidth. Then, the Node B scheduler may determine the scheduling parameters and the assigned RBs (if any), for the UE data signal transmission in subsequent TTIs.

Embodiments of the invention also include designs where the data signal bandwidth equals the bandwidth of the RS that is substantially transmitted over the entire scheduling bandwidth. This may occur due to a number of different reasons. For example, a particular UE may be scheduled over the entire scheduling bandwidth. Also, when only time domain scheduling (within a particular frequency band) is performed, the data signal occupies the entire scheduling frequency band, provided that the UE is being scheduled.

Embodiments of the invention also include designs where a data signal in some sub-frames of a TTI is transmitted instead of the RS in the RS transmission periods. For example, if a particular low speed UE is scheduled on the same RBs for a number of consecutive sub-frames or TTIs, then the corresponding RBs in the RS transmission periods in some sub-frames of those TTIs may carry data. This is because adequate RS for channel estimation may already be obtained from the RS transmission periods in the remaining sub-frames where RS transmission does occur. In addition, especially for low-speed UEs in good SINR conditions, an accurate CQI estimate may be obtained without a UE transmitting in every sub-frame a distributed RS in the corresponding RS transmission period.

Embodiments of the invention also include designs where for a TTI consisting of at least two sub-frames, the RS from a UE in one RS transmission period of one sub-frame occupies wider bandwidth than data signal and it occupies substantially the same bandwidth as the data signal in the corresponding RS transmission period of another sub-frame. For example, for a TTI comprising of two sub-frames, the UE may transmit a distributed RS over an RSMB (scheduling) bandwidth during one of the RS transmission periods in a sub-frame and may transmit a localized RS over substantially the same bandwidth as occupied by the data signal during the corresponding RS transmission in the other sub-frame. This may be desirable when the UEs multiplexed in an RSMB are few and can provide good CQI estimate with a single distributed RS transmission period. Alternatively, a UE may substitute localized RS transmissions in some sub-frames with distributed ones in case a good CQI estimate requires several distributed RS transmissions. The reverse may also apply (that is the RS occupies wider bandwidth than the data signal in the corresponding localized RS transmission period of another sub-frame).

Embodiments of the invention apply to frequency domain scheduled SC-FDMA signal transmissions where at least a part of a RS is scheduled jointly with a corresponding data signal using a resource map "f" which maps RSMBs to data signal resource blocks ("f" is the Resource Block Map). Embodiments also include construction and use of a Resource Block Map, which maps RS RBs to data signal RBs.

Embodiments of the invention apply to the dual use of the RS, in at least one RS transmission period of a sub-frame having multiple RS transmission periods, for channel quality estimation and for channel estimation. The use of the RS in the remaining RS transmission periods of the sub-frame is substantially for channel estimation.

Embodiments of the invention apply to limiting the maximum number of UEs that are allowed to simultaneously transmit RS substantially over a predetermined frequency band where scheduling may be performed.

Embodiments of the invention apply to the construction and use of reference signal multiplexing blocks (RSMB), which are contiguous, non-overlapping blocks of bandwidth and are used to multiplex simultaneous distributed RS transmissions (for CQI estimation and possibly channel estimation) from multiple UEs and to perform scheduling of UEs during a particular TTI exclusively within an RSMB. The distributed RS transmission is confined within an RSBM and does not cross over into different RSMBs. The distributed RS transmission from a UE also having a data signal transmission in an RSMB, may be over the same RSMB or over a different RSMB.

Embodiments of the invention apply to the construction and use of a RS for channel quality estimation that enables scheduled transmissions in subsequent TTIs.

While several embodiments have been provided in the disclosed invention, it should be understood that the disclosed systems and methods may be embodied in many other specific forms without departing from the spirit or scope of the invention. The examples are to be considered as illustrative and not restrictive, and the intention is not to be limited to the details given herein, but may be modified within the scope of the appended claims along with their full scope of equivalents. The term UE may also be understood in the context of multiple antenna transmission from the same UE. The extension of all multi-UE designs described above to multi-antenna designs is straightforward by treating an additional antenna from the same UE as another UE.

Embodiments of the invention apply to EUTRA, and may also apply to other wireless standards including, but not limited to, WiMax, 802.11, 802.20, and 3GPP2 evolution. Embodiments of the invention apply to all similar designs in multi-hop wireless networks and ad-hoc wireless networks.

Additionally, techniques, systems, subsystems and methods described and illustrated in the various embodiments as discrete or separate may be combined or integrated with other systems, modules, techniques, or methods without departing from the scope of the disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for transmitting reference signals from a user equipment transmitting a data signal having a bandwidth in a frequency division multiple access transmission system having a transmission sub-frame comprising at least two reference signal transmission periods and further comprising a plurality of data signal transmission periods, said method comprising:

transmitting a first reference signal occupying a larger bandwidth than said data signal bandwidth during at least one of said at least two reference signal transmission periods; and transmitting a second reference signal occupying the same bandwidth as said data signal bandwidth during at least one of said at least two reference signal transmission periods, wherein the reference signal transmissions of the transmission sub-frame is distributed over the entire scheduling bandwidth for channel sounding.

2. The method of claim 1, wherein said first reference signal is transmitted using code division multiplexing.

3. The method of claim 1, wherein said first reference signal is transmitted using frequency division multiplexing.

4. The method of claim 1, wherein said first reference signal is transmitted using a hybrid of code division multiplexing and frequency division multiplexing.

5. The method of claim 1, wherein said second reference signal is transmitted using code division multiplexing.

6. The method of claim 1, wherein said second reference signal is transmitted using frequency division multiplexing.

7. The method of claim 1, wherein said second reference signal is transmitted using a hybrid of code division multiplexing and frequency division multiplexing.

8. The method of claim 1, wherein said first reference signal bandwidth encompasses all of said second reference signal bandwidth.

9. A method for transmitting a reference signal from a user equipment in a frequency division multiple access transmission system having a transmission sub-frame containing at least two reference signal transmission periods and further having a scheduling bandwidth, said method comprising:

transmitting said reference signal occupying the same bandwidth as said scheduling bandwidth during at least one but not all of said at least two reference signal transmission periods; and discontinuing the transmission of said reference signal during the remaining of said at least two reference signal transmission periods, wherein the reference signal transmissions of the transmission sub-frame is distributed over the entire scheduling bandwidth for channel sounding.

10. The method of claim 9, wherein a bandwidth that is smaller than the total system bandwidth.

11. The method of claim 9, wherein said reference signal is transmitted using code division multiplexing.

12. The method of claim 9, wherein said reference signal is transmitted using frequency division multiplexing.

13. The method of claim 9, wherein said reference signal is transmitted using a hybrid of code division multiplexing and frequency division multiplexing.

14. A method for transmitting a plurality of reference signals from a user equipment transmitting a data signal having a bandwidth in a frequency division multiple access transmission system having a transmission sub-frame containing at least two reference signal transmission periods and further containing a plurality of data signal transmission periods, and having a transmission time interval containing at least two sub-frames said method comprising:

transmitting a first reference signal occupying larger bandwidth than said data signal bandwidth during at least one of said at least two reference signal transmission periods during a first of said at least two sub-frames;

transmitting a second reference signal occupying the same bandwidth as said data signal bandwidth during at least one of said at least two reference signal transmission periods during a first of said at least two sub-frames; and transmitting a third reference signal occupying the same bandwidth as said data signal bandwidth during all of said at least two reference signal transmission periods during a second of said at least two sub-frames, wherein the reference signal transmissions of the transmission sub-frame is distributed over an entire scheduling bandwidth for channel sounding.

15. The method of claim 14, wherein a first or a second or a third said plurality of reference signals is transmitted using code division multiplexing.

16. The method of claim 14, wherein a first or a second or a third said plurality of reference signals is transmitted using frequency division multiplexing.

17. The method of claim 14, wherein a first or a second or a third said plurality of reference signals is transmitted using a hybrid of code division multiplexing and frequency division multiplexing.

18. The method of claim 14, wherein said first reference signal bandwidth encompasses all of said second and third reference signals bandwidth.

19. The method of claim 14, wherein said first reference signal bandwidth does not encompass any of said second and third reference signals bandwidth.

20. A method for transmitting a plurality of reference signals from a user equipment transmitting a data signal having a bandwidth in a frequency division multiple access transmission system having a transmission sub-frame containing at least two reference signal transmission periods and further containing a plurality of data signal transmission periods, and having a transmission time interval containing at least two sub-frames said method comprising:

transmitting a first reference signal occupying larger bandwidth than said data signal bandwidth during at least one of said at least two reference signal transmission periods during a first of said at least two sub-frames;

transmitting a second reference signal occupying the same bandwidth as said data signal bandwidth during at least one of said at least two reference signal transmission periods during a first of said at least two sub-frames; and transmitting a third reference signal occupying larger bandwidth than said data signal bandwidth during all of said at least two reference signal transmission periods during a second of said at least two sub-frames, wherein the reference signal transmissions of the transmission sub-frame is distributed over an entire scheduling bandwidth for channel sounding.

21. The method of claim 20, wherein a first or a second or a third said plurality of reference signals is transmitted using code division multiplexing.

22. The method of claim 20, wherein a first or a second or a third said plurality of reference signals is transmitted using frequency division multiplexing.

23. The method of claim 20, wherein a first or a second or a third said plurality of reference signals is transmitted using a hybrid of code division multiplexing and frequency division multiplexing.

24. The method of claim 20, wherein said first or third reference signals bandwidth encompasses all of said second reference signal bandwidth.

25. The method of claim 20, wherein said first or third reference signals bandwidth does not encompass any of said second reference signal bandwidth.

26. A method for multiplexing a plurality of reference signals from at least two user equipments in a frequency division multiple access transmission system having a transmission sub-frame containing at least two reference signal transmission periods and further containing a plurality of data signal transmission periods, said method comprising:

one of said at least two user equipments transmitting a first reference signal and a first data signal having a bandwidth, said first reference signal occupying larger bandwidth than said first data signal bandwidth during at least one of said at least two reference signal transmission periods; and second of said at least two user equipments transmitting a second reference signal and a second data signal having a bandwidth, said second reference signal occupying larger bandwidth than said second data signal bandwidth during the same of said at least one of said at least two reference signal transmission periods, wherein the reference signal transmissions of the transmission sub-frame is distributed over an entire scheduling bandwidth for channel sounding.

27. The method of claim 26, wherein a first or a second or a third said plurality of reference signals is transmitted using code division multiplexing.

28. The method of claim 26, wherein a first or a second or a third said plurality of reference signals is transmitted using frequency division multiplexing.

29. The method of claim 26, wherein a first or a second or a third said plurality of reference signals is transmitted using a hybrid of code division multiplexing and frequency division multiplexing.

* * * * *